United States Patent
Moore et al.

(10) Patent No.: US 8,942,907 B2
(45) Date of Patent: Jan. 27, 2015

(54) METHOD OF AVOIDING BRAKE DISC SCORING IN A VEHICLE

(71) Applicant: Ford Global Technologies, LLC, Deadborn, MI (US)

(72) Inventors: Ian Moore, Pulheim (DE); Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 13/622,443

(22) Filed: Sep. 19, 2012

(65) Prior Publication Data

US 2013/0073164 A1 Mar. 21, 2013

(51) Int. Cl.
*B60T 7/00* (2006.01)
*B60T 7/12* (2006.01)
*B60T 17/22* (2006.01)

(52) U.S. Cl.
CPC .............. *B60T 7/12* (2013.01); *B60T 17/221* (2013.01); *B60T 2201/124* (2013.01)
USPC ........ 701/71; 701/1; 701/70; 701/96; 701/80; 701/111; 340/435; 340/436; 340/439; 340/576

(58) Field of Classification Search
CPC .............. B60T 7/00; B60T 7/22; B60T 7/712
USPC ........ 701/70, 96, 111, 65, 36, 1, 80; 340/435, 340/436, 439, 576, 463, 467
See application file for complete search history.

(56) References Cited

U.S. PATENT DOCUMENTS

| | | | | |
|---|---|---|---|---|
| 5,530,651 A * | 6/1996 | Uemura et al. | ............... | 701/301 |
| 5,805,103 A * | 9/1998 | Doi et al. | ........................ | 342/70 |
| 6,098,007 A * | 8/2000 | Fritz | ................................ | 701/93 |
| 6,104,976 A * | 8/2000 | Nakamura | ...................... | 701/95 |
| 6,571,165 B2 * | 5/2003 | Maruko et al. | .................. | 701/93 |
| 6,591,180 B1 * | 7/2003 | Steiner | ............................ | 701/96 |
| 6,650,987 B2 * | 11/2003 | Kogure et al. | .................. | 701/80 |
| 6,672,687 B2 * | 1/2004 | Nishio | ...................... | 303/122.09 |
| 6,675,096 B2 * | 1/2004 | Matsuura | ...................... | 701/301 |
| 6,691,015 B1 * | 2/2004 | Levine | ............................. | 701/70 |
| 7,729,841 B2 * | 6/2010 | Knoop et al. | ................... | 701/80 |
| 8,086,384 B2 * | 12/2011 | Nakayama | ....................... | 701/79 |
| 2001/0016795 A1 * | 8/2001 | Bellinger | ........................ | 701/53 |
| 2002/0021045 A1 * | 2/2002 | Hada et al. | ...................... | 303/113.1 |
| 2002/0087251 A1 * | 7/2002 | Kogure et al. | ................... | 701/80 |
| 2002/0107629 A1 * | 8/2002 | Maruko et al. | .................. | 701/93 |
| 2004/0030498 A1 * | 2/2004 | Knoop et al. | ................. | 701/301 |
| 2004/0145238 A1 * | 7/2004 | Seto et al. | ...................... | 303/193 |

(Continued)

*Primary Examiner* — John R Olszewski
*Assistant Examiner* — Truc M Do
(74) *Attorney, Agent, or Firm* — Joseph E. Root

(57) ABSTRACT

A method for avoiding reducing scoring of the brake disc or the brake drum of a vehicle driven under rainy conditions calculates a product of three parameters, and activates an automatic braking operation for the vehicle, regularly, whenever the product exceeds the pre-determined threshold level. The first parameter is a rain intensity based parameter, a measure of the current raining intensity. The second parameter is a brake-activation-free driving time parameter, representing the time elapsed since the braking system of the vehicle was activated last. The third parameter is a speed parameter, which represents a current speed of the vehicle. As the automatic braking operation is carried out, the particles of dust, water, snow and de-icing substances, adhered to the brake disc of the vehicle, and causing scoring of the brake disc, are quickly removed, thus, reducing disc scoring.

12 Claims, 2 Drawing Sheets

(56) References Cited

U.S. PATENT DOCUMENTS

| | | | |
|---|---|---|---|
| 2004/0236491 A1* | 11/2004 | Seto | 701/96 |
| 2006/0229771 A1* | 10/2006 | Messner et al. | 701/1 |
| 2008/0189000 A1* | 8/2008 | Duong | 701/20 |
| 2008/0312834 A1* | 12/2008 | Noda et al. | 701/301 |
| 2008/0319624 A1* | 12/2008 | Aizawa et al. | 701/70 |
| 2009/0128318 A1* | 5/2009 | Nagata et al. | 340/467 |
| 2010/0007200 A1* | 1/2010 | Pelosse | 303/7 |
| 2013/0023382 A1* | 1/2013 | Ljungdahl | 477/185 |
| 2013/0025273 A1* | 1/2013 | Nozawa et al. | 60/545 |
| 2013/0060440 A1* | 3/2013 | Fukushiro | 701/70 |

* cited by examiner

METHOD OF AVOIDING BRAKE DISC SCORING IN A VEHICLE

TECHNICAL FIELD

The present disclosure generally relates to braking systems for automotive vehicles, and, more specifically, to automotive vehicles using drum/disc brakes as integral components of their braking systems.

BACKGROUND

Many automotive vehicles, including cars, SUVs, motorbikes, etc., have braking systems equipped with disc brakes. Generally, in such braking system, when the brakes are activated, a metallic disc continuously engages with a set of brake pads, to stop the wheels quickly. The brake pads are generally mounted on a set of brake calipers, which keeps them in continuous contact with the brake disc, and the friction produced during the contact ceases the rotation of the wheels.

'Brake Disc Scoring', in this context, refers to a state of brake disc erosion that reduces friction between the brake pads and the brake disc, when they are in contact with each other. Further, it's generally a short term effect of cosmetic nature, however, severe brake disc scoring can lead to reduced brake disc integrity under high thermo-mechanical load. Under rainy conditions, when a vehicle is driven on a wet road surface, the brake discs have a higher tendency to pick up small metallic particles from the road surface. In certain regions, where the winter season is often accompanied by snowfall, the problem of disc scoring is exacerbated, when moist gluey particles of a mixture containing water, snow and de-icing substances used for thawing the snow layer deposited on the roads, such as salt, stick to the brake pads or the brake disc. When a substantial amount of metallic particles stick to, and eventually, get accumulated over the brake disc, the reduced friction within the region of contact of the brake pads and the brake disc, may lead to disc scoring. Eventually, this may reduce the braking power of the disc brakes. Further, this may also lead to weakening of the strength of the brake disc or the brake drum, a problem that cannot be ignored, specifically, under high thermo-mechanical load conditions.

Many conventional attempts have been made to avoid scoring of the brake disc or the brake drum in vehicles. One such solution in the art attempts to alleviate the problem by applying brake linings to the brake disc or the brake drum of the vehicle. The brakes of the vehicle are activated, to produce a minimal deceleration, for removing the particles deposited on the brake disc/drum, based on certain conditions. Such conditions take many factors into account, such as, detection of the driver's activation of the accelerator pedal or the brake pedal, checking a driver independent braking process intervention, a yaw rate control process, a traction rate control process, detecting wet/rainy conditions using sensors coupled to the vehicle or the wiper frequency, etc.

Other conventional attempts to reduce brake disc scoring rely on detecting a brake-activation-free time for vehicles, under wet conditions. Specifically, if the time elapsed since the braking system of the vehicle was last activated, reaches a certain threshold value, an automatic braking operation is carried out, to remove particles deposited on the brake disc.

In another attempt, electromotive actuation devices coupled to both sides of the brake disc, are actuated, to clean the brake disc. Similarly, many other conventional methods incorporate factors, such as, the time of year, the geographic location, climatic zone, atmospheric moisture, external temperature, design of the road network, fuel consumption, engine running time, overall rotational speed of the engine, the distance traveled by the vehicle since last braking operation was performed, to reduce brake disc scoring.

Considering the aforementioned problems, and in light of the conventional solutions, a need still exists for a more accurate and efficient method for substantially reducing scoring of the brake disc/brake drum of a vehicle, especially when the vehicle is driven in rainy conditions.

SUMMARY

The present disclosure provides a method for reducing scoring of the brake disc/brake drum of a vehicle, in general, and particularly, when the vehicle is driven under wet ambient conditions.

In one aspect, the method for avoiding scoring of the brake disc activates and carries out an automatic braking operation for the vehicle, to remove particles sticking to the brake disc. Specifically, the method calculates a product of three different parameters, before activating the automatic braking operation. The first parameter is a rain intensity based parameter, which depicts the intensity of rain, as the vehicle is driven in rainy conditions. The second parameter is a brake-activation-free driving time based parameter, which indicates the time elapsed since the last time the brakes of the vehicle were activated. The third parameter is a speed parameter, representing the current speed of the vehicle. Further, the method calculates the product of these parameters, and checks whether the product exceeds a pre-determined threshold level. Eventually, if the product exceeds the pre-determined threshold level, the method activates and carries out the automatic braking operation, to clean the brake disc.

The method substantially alleviates the problem of brake disc scoring during rainy weather conditions, when the vehicle is driven on a wet road surface. Further, the method maintains the braking power of the disc brake system of the vehicle, even under high thermo-mechanical load conditions.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description illustrates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

Scoring of the brake disc/brake drum of a vehicle becomes more prevalent, when a vehicle is driven on a wet, snowy or muddy road surface, under rainy conditions. Specifically, accumulation of metallic particles on the brake disc, can score the brake disc, which in turn may substantially reduce the coefficient of friction between the brake disc and the brake pads in contact with them, thus, affecting the braking power.

The present disclosure provides a method for activating and carrying out an automatic braking operation for a vehicle driven under the influence of wet conditions (specifically, under rainy conditions), to alleviate scoring of the brake disc or the brake drum of the vehicle's braking system. During the process of carrying out the braking operation automatically, a deceleration is produced in vehicle, which is minimally perceptible to the vehicle's occupants, and the braking operation quickly removes the particles accumulated over the brake disc or the brake drum of the vehicle.

Figure 1:
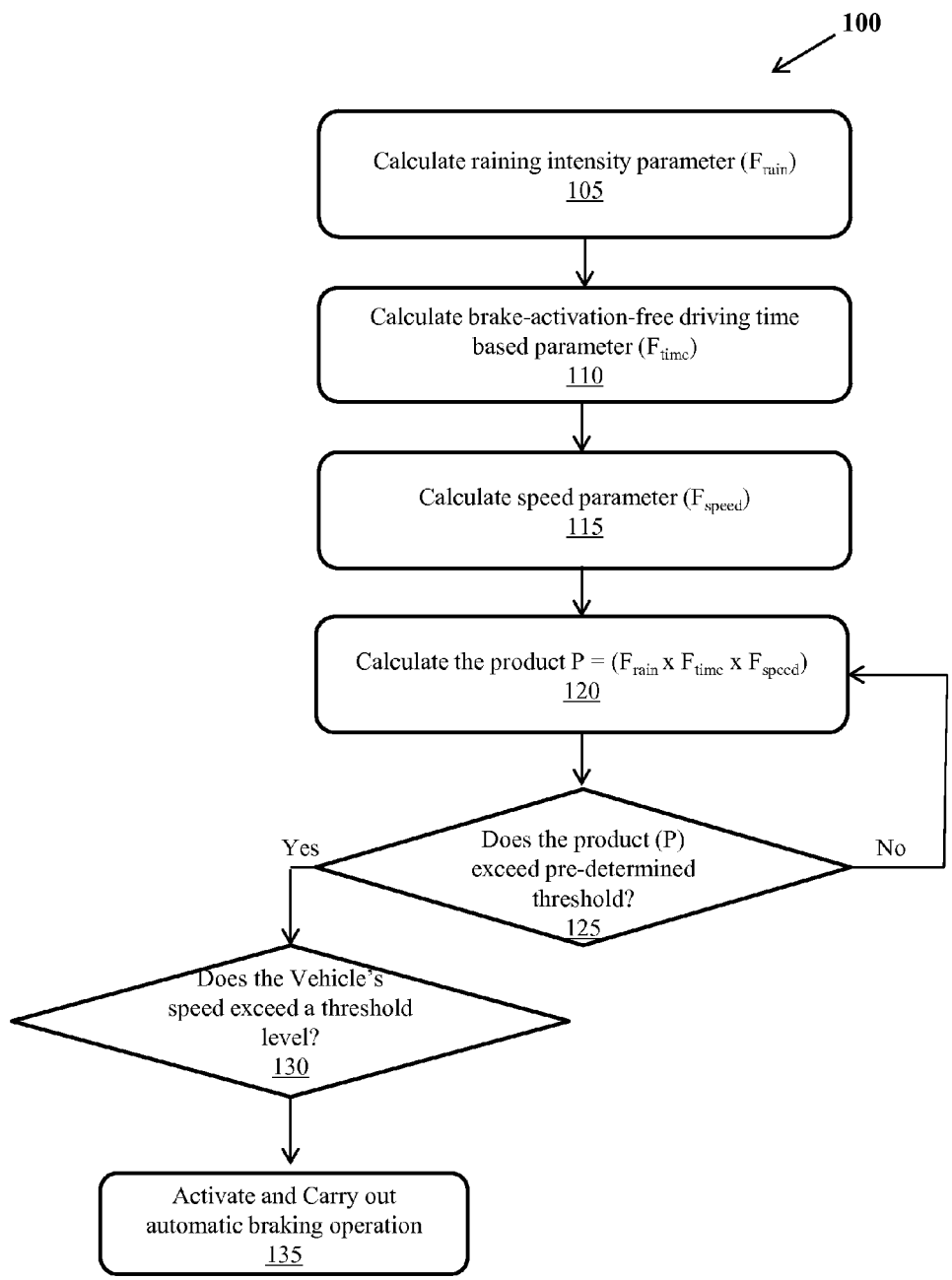
FIG. 1 is a flowchart showing the steps involved in a method for reducing brake disc scoring for a vehicle, in accordance with the present disclosure.

FIG. 1 is a flow chart illustrating a method 100 of reducing scoring of the brake disc of a vehicle, in accordance with an embodiment of the present disclosure. As shown, at step 105, the method first calculates a rain intensity parameter ($F_{rain}$). The parameter $F_{rain}$ is an instantaneous measure of how heavily it is raining, at any specific moment. In an embodiment, the parameter ($F_{rain}$) is proportional to, and is determined by measuring the wiping frequency of the front windshield wiper of the vehicle. The rear windshield wiper's wiping frequency may also be taken into account while calculating the rain intensity parameter ($F_{rain}$).

In a preferred embodiment, a raining intensity detection sensor is coupled to an appropriate portion of the vehicle, to detect the rain intensity parameter ($F_{rain}$). The sensor provides an absolute detection of the raining intensity, and incorporates any flaw arising while detecting the instantaneous raining intensity, due to certain cases, such as, when the driver of the vehicle may manually fluctuate the windshield wiper's frequency based on his/her own preference and comfortability. In such cases, detecting $F_{rain}$ based on the windshield wiper's wiping frequency may not provide an absolute measure of raining intensity. Therefore, unnecessarily short cycle times of activation of the automatic braking operation, owing to driver's manual activation or fluctuation of the wiping frequency of the windshield wiper, may be avoided in those cases.

In another embodiment, the rain intensity parameter may be calculated by incorporating inputs from both the raining intensity detection sensor, and the front windshield wiper's wiping frequency, to have an even more precise estimation of the actual raining intensity. For example, an average of the raining intensity value detected by the sensor, and the same value detected through the front windshield wiper's frequency, may be taken, to calculate $F_{rain}$. Further, proportionate weightages may be assigned to the input from the sensor, and the wiping frequency, while calculating $F_{rain}$. This ensures an appropriate approximation of the instantaneous raining intensity.

Any appropriate sensor known in the art, can be used as a raining intensity detection sensor, for detecting the intensity of rain. Further, it is apparent that the rain intensity parameter ($F_{rain}$) is minimal under low intensity raining conditions, and shifts to zero level, when it stops raining At step 110, the method calculates a brake-activation-free driving time based parameter ($F_{time}$). This parameter represents the time elapsed since the brakes of the vehicle were activated last. This may be the time elapsed since the driver manually activated the brakes last, or a driver assistance system coupled to the vehicle automatically activated the brakes, the time since when a braking system controlling apparatus of the vehicle went dormant, i.e., in a sleep mode, or the time when the last automatic braking operation to reduce brake disc scoring was carried out. Effectively, the more time elapsed since the vehicle has been driven brake-free, the higher the brake-activation-free driving time based parameter ($F_{time}$), and vice versa.

Further, during the process of calculating the brake-activation-free driving time parameter ($F_{time}$), if one or more of certain conditions owing to the activation of brakes is identified, the parameter $F_{time}$ is reset to a zero value. For example, if the driver manually activates the brakes, or a driver assistance system of the vehicle activates the brakes, or a brake controlling device of the vehicle changes its status and goes into 'sleep mode', the brake-activation-free driving time based parameter ($F_{time}$) is set to zero value immediately. This further avoids unnecessarily frequent activation of the automatic braking process of the present disclosure. Consequently, both the economic operation of the vehicle and effective cleaning of the brake disc or the brake drum of the vehicle's braking system are achieved.

In a preferred embodiment, the brake-activation-free driving time parameter ($F_{time}$) is monitored and calculated only when any wet conditions are ever detected around the vehicle. Input from the raining intensity detection sensor or the front windshield wiper's wiping frequency, are incorporated for that purpose. For example, the brake activation free driving time may not be monitored at all, when the rain stops, or the front windshield wiper has been inactive for a reasonably long time.

At step 115, the method calculates a speed parameter ($F_{speed}$) representing a current speed of the vehicle. The speed parameter is higher when the vehicle is driven at higher speeds, and vice versa.

To calculate the speed parameter ($F_{speed}$), it may be mapped as an appropriate function of the speed of the vehicle. In an embodiment, the speed parameter is mapped on the speed of the vehicle, by modeling it as a linearly increasing function thereof. In such a case, mathematically, the speed parameter ($F_{speed}$) may be evaluated through a simple linear equation:

$F_{speed}$=Kv, with 'K' being a pre-determined constant, and 'v' being the vehicle's current speed. Apparently, $F_{speed}$ is zero, when the vehicle stops, and it increases with the increase in vehicle's speed.

In certain embodiments, $F_{speed}$ may be calculated by mapping it as a non-linearly increasing function of the speed of the vehicle, for a better and more precise approximation. Typical examples of such non-linear functions may be, such as, exponential functions, logarithmic functions, convex-upwardly increasing functions, or concave-upwardly increasing functions, etc. However, such functions are merely exemplary, and are not intended to limit to scope of the disclosure in terms of calculating the speed parameter. Using other mathematical functions, for evaluating the speed parameter as a function of the speed of the vehicle, is well within the scope of the present disclosure.

The automatic braking operation, for cleaning the brake disc, thus avoiding disc scoring, is carried out more frequently at higher vehicle speeds, and vice versa.

In a preferred embodiment, the automatic braking operation is not carried out at all, till the speed parameter ($F_{speed}$) reaches a pre-determined threshold. This avoids carrying out of the automatic braking operation at reasonably low speeds, where such as operation may produce a deceleration perceptible to the vehicle occupants, and unnecessarily intrigue them. Typical threshold vehicle speed parameter values ($F_{speed}$) above which the automatic braking operation is allowed to be activated, may be in the range of about 30-40

Kmph. However, the specified range may vary, and is not intended to limit the scope of application of the method of the present disclosure.

Precise calculation of the speed parameter avoids unnecessary activation of the automatic braking operation, by incorporating certain cases, like stop-and-go traffic conditions, or the vehicle being stationary during rain, etc. Each time the vehicle comes to a halt, the parameter $F_{speed}$ is reset to zero level.

At step 120, the method calculates the product of the three parameters, i.e., the rain intensity based parameter ($F_{rain}$), the brake-activation-free driving time parameter ($F_{time}$), and the speed parameter ($F_{speed}$).

At step 125, the method checks whether the product (P) of the three parameters, i.e., $P=F_{rain} \times F_{time} \times F_{speed}$ exceeds a pre-determined threshold value. If it exceeds, then, as shown at step 135, the method proceeds towards activating and carrying out the automatic braking operation for the vehicle, to remove particles adhering to the brake disc. However, if the product still does not exceed the pre-determined threshold, the method continues monitoring it, as shown.

Preferably, an intermediating step 130, as shown, is included in the method, where the current speed of the vehicle is checked even if the product of the three parameters exceeds the threshold, before carrying out the automatic braking operation. Effectively, this step ensures that the automatic braking operation is carried out only if the vehicle's speed exceeds a predetermined threshold.

The quantity of water, dust, metallic particles, and particles of de-icing salt, that are major contributors to brake disc scoring, under rainy conditions, is effectively modeled as being proportional to the product of the three parameters (i.e., $F_{rain}$, $F_{time}$ and $F_{speed}$), according to the method of the present disclosure. Consequently, the method ensures precise cycle times for carrying out the automatic braking operation, to clear the brake disc.

While carrying out the automatic braking operation, the brake pressure within the vehicle's braking system is generated and controlled through a master brake cylinder, which may be operated mechatronically. Effects of brake pressure variations due to certain driver assistance systems present in the vehicle, like the electronic stability control (ESC), the inter-vehicle distance control system (ADR), or an adaptive cruise control (ACC), may be easily taken into account, using such a master brake cylinder, to produce the required imperceptible deceleration, which is adequate to quickly clean the scored brake disc.

Figure 2:
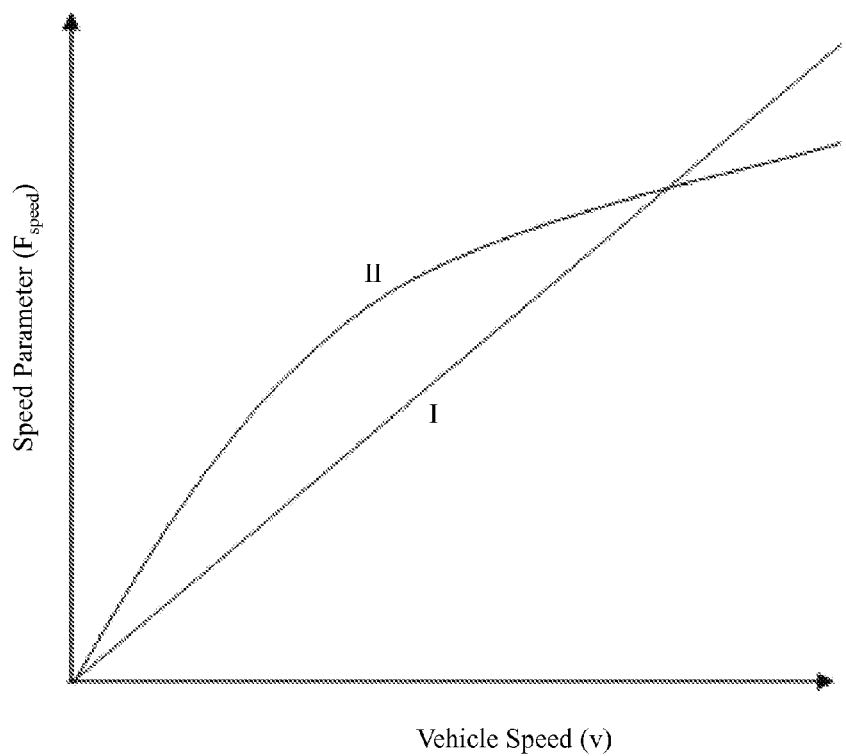
FIG. 2 is a graph illustrating variation of a speed parameter for the vehicle, as a function of a current speed of the vehicle, the speed parameter being used for carrying out an automatic braking operation to reduce brake disc scoring, in accordance with an embodiment of the present disclosure.

FIG. 2 is a graph illustrating two different cases showing variation of the speed parameter ($F_{speed}$), as functions of the current speed of the vehicle (v). In case I, $F_{speed}$ is mapped as a linearly increasing function of the speed of the vehicle, and is zero, when then vehicle's speed is zero. The slope of the linear variation (i.e., increment), may be pre-determined, based on certain factors. Further, each specific ordinate value on the graph corresponds to a current vehicle speed, and the corresponding abscissa value represents a respective speed parameter value.

In case II, as shown, the speed parameter ($F_{speed}$) is being mapped as a non-linearly increasing function of the speed of the vehicle (v). As aforementioned, the function used, may be a logarithmic function, an exponential function, a radical function, etc., to have a more accurate level of precisions in calculating $F_{speed}$.

The method of the present disclosure involves relatively low expenditure, and facilitates precise determination of the frequency of automatic activation of the braking operation, to clean the brake disc, and hence, easily reduces brake disc scoring, by incorporating contribution of the all the three major calculated parameters on which the quality of particles accumulated on the brake disc, is inherently dependent on.

Further, the method of the present disclosure, for reducing scoring of the brake disc of a vehicle, driven under rainy conditions, can be applied to any kind of vehicle, including cars, motorbikes, SUVs, etc.

Although the current invention has been described comprehensively, in considerable details, to cover the possible aspects and embodiments, those skilled in the art would recognize that other versions of the invention are also possible.

What is claimed is:

1. A method for reducing scoring of a brake disc within a braking system of a vehicle, under wet conditions, the method comprising:
    activating and carrying out an automatic braking operation for the vehicle, based on:
        detecting whether a product of at least a rain intensity based parameter, a brake-activation-free driving time based parameter, and a speed parameter pertaining to a current speed of the vehicle, exceeds a predetermined threshold level; and
    resetting a current value of the brake-activation-free driving time based parameter, on detecting one or more conditions, the conditions including:
        activation of the braking system of the vehicle by one of the driver or a driver assistance system of the vehicle;
        a brake control mechanism of the vehicle switching to a sleep mode; and
        the automatic braking operation being activated.

2. The method of claim 1, further comprising, activating the automatic braking operation for the vehicle, only if the speed of the vehicle exceeds a pre-determined minimum threshold level.

3. The method of claim 1, further comprising, evaluating the rain intensity based parameter using a raining intensity detection sensor.

4. The method of claim 1, further comprising, evaluating the rain intensity based parameter by measuring a wiping frequency of at least one of a front and a rear windshield wiper of the vehicle.

5. The method of claim 1, further comprising, evaluating the speed parameter as a linearly increasing function of the speed of the vehicle.

6. The method of claim 1, further comprising, evaluating the speed parameter as a non-linearly increasing function of the speed of the vehicle.

7. The method of claim 6, further comprising, setting the speed parameter to a zero value, when the vehicle stops.

8. The method of claim 1, further comprising, assigning a zero value to the brake-activation-free driving time parameter, based on detection of the one or more conditions.

9. The method of claim 1, wherein, during carrying out the automatic braking operation, producing a deceleration of the vehicle that is imperceptible to the occupants of the vehicle.

10. The method of claim 1, further comprising, controlling the brake pressure within the braking system, by carrying out the automatic braking operation through a driver assistance system of the vehicle.

11. The method of claim 1, further comprising, stopping the automatic braking operation, when the product acquires a value below the pre-determined threshold value.

12. The method of claim 1, wherein, during the process of carrying out the automatic braking operation for the vehicle, using a mechatronically operable brake master cylinder for facilitating the availability of, and for controlling, the brake pressure within the vehicle's braking system.

* * * * *